United States Patent [19]

Ashley et al.

[11] Patent Number: 5,039,718

[45] Date of Patent: Aug. 13, 1991

[54] FILLERS

[75] Inventors: Reginald J. Ashley, Runcorn Cheshire; Martin B. Evans, Cheshire; Roger N. Rothon, Giulden Sutton, all of United Kingdom

[73] Assignee: Imperial Chemical Industries PLC, London, England

[21] Appl. No.: 196,490

[22] Filed: May 20, 1988

[30] Foreign Application Priority Data

May 22, 1987 [GB] United Kingdom ............... 8712105
Aug. 13, 1987 [GB] United Kingdom ............... 8719165

[51] Int. Cl.$^5$ .......................... C08K 9/12; C08K 9/04
[52] U.S. Cl. ..................................... 523/202; 523/203; 523/205; 523/206
[58] Field of Search ................ 523/202, 203, 205, 206

[56] References Cited

U.S. PATENT DOCUMENTS

| | | | |
|---|---|---|---|
| 4,363,885 | 12/1982 | Fukui et al. | 523/203 |
| 4,650,818 | 3/1987 | Oka et al. | 523/205 |
| 4,690,959 | 9/1987 | Plueddemann | 523/202 |
| 4,694,031 | 9/1987 | Morita et al. | 523/203 |
| 4,707,505 | 11/1987 | Matsuno et al. | 523/203 |
| 4,870,118 | 9/1989 | Kinoshita et al. | 523/205 |
| 4,908,396 | 3/1990 | Evans et al. | 523/203 |

FOREIGN PATENT DOCUMENTS

| | | | |
|---|---|---|---|
| 0074649 | 6/1977 | Japan | 523/205 |
| 0165960 | 12/1980 | Japan | 523/205 |
| 0167743 | 12/1981 | Japan | 523/202 |
| 0005735 | 1/1982 | Japan | 523/202 |
| 0042748 | 3/1982 | Japan | 23/202 |
| 0096639 | 6/1983 | Japan | 523/205 |

*Primary Examiner*—Herbert J. Lilling
*Attorney, Agent, or Firm*—Cushman, Darby & Cushman

[57] ABSTRACT

A cohesive polymer matrix comprising a matrix polymer and a coated particulate fillter dispersed therein, characterized in that the matrix polymer is a crosslinked olefin/acrylic polymer, and the filler is coated at least in part with a composition comprising an organic coating polymer of number average molecular weight of up to 200,000, which contains an acidic group (or a precursor thereof) and an unsaturated group optionally linked to the matrix polymer and a process for its production, and precursors thereof for use in the process.

7 Claims, No Drawings

FILLERS

This invention relates to filled cohesive polymer matrices, a process for their production, and precursors thereof for use in the process.

It is known to modify the properties of a variety of organic polymers by incorporating into such polymers one or more inorganic materials in finely divided form. These inorganic materials, commonly known as fillers, may be used with economic advantage to bulk out the resultant polymer and to enhance at least some of the physical properties of the polymer.

It is also known to enhance some of the interactive physical properties between a filler and the polymer matrix or precursor thereof in which it is used, and in turn to enhance the processability of the filler-precursor mixture or the properties of the filled matrix, which depend on such interactive properties. Thus, to improve the dispersibility of the filler in the matrix, or to enhance, the tensile modulus, tensile strength, or resistance to wear of a filled polymer matrix inter alia, it is desirable to make such fillers and their matrix polymers as mutually compatible as possible and in the latter case to try to optimize filler-polymer bonding. This may be achieved by coating the filler with a material having good filler-coating bonding and to surround it with a matrix having particularly good coating-matrix bonding.

Similarly it is known to confer fire-resistance on organic polymers by incorporating into them one or more particulate fire-retardants which may also serve as fillers. It is generally necessary to achieve a high filler loading in order to confer adequate fire-resistance, and to this end it is necessary to enhance filler dispersion. This may be achieved by coating the filler with a material which reduces the viscosity of the production mix. It is not always possible to retain or enhance good tensile properties whilst conferring or enhancing fire-resistance.

We have now found that the physical properties (such as strength and hardness) and/or fire resistance of some polymer matrices can be surprisingly enhanced without mutual detriment by the use of certain filler coating materials.

Accordingly, in a first aspect the present invention provides a cohesive polymer matrix comprising a matrix polymer and a coated particulate filler dispersed therein, characterized in that the matrix polymer is a cross-linked olefin/acrylic polymer, and the filler is coated at least in part with a composition comprising an organic coating polymer of number average molecular weight of up to 200,000, which contains an acidic group (or a precursor thereof) and an unsaturated group, optionally linked to the matrix polymer.

The polymer matrix may comprise more than one cross-linked olefin/acrylic polymer, at least one precursor of such a polymer (e.g. a corresponding non-cross-linked polymer), at least one other polymer, and/or more than one particulate filler provided that at least one such filler is coated as described hereinbefore.

Preferably the filler is inorganic and finely particulate. The coating composition may contain more than one coating polymer as hereinbefore defined.

The term "olefin/acrylic polymer" herein mean any polymer the chains of which are based on monomer units selected from optionally substituted olefins (other than acylics) and acrylics (i.e. monomers comprising a substituted C=C—CO moiety), optionally copolymerised with other monomer species. Preferably they are selected from such olefins optionally copolymerised with acrylics. These chains are cross-linked in the present matrices, for example by free-radical cross-linking of the saturated polymer chain, for example using electromagnetic or electron radiation, or by cross-linking of unsaturated (e.g. olefinic) or condensable (e.g. substituted silyl) functions in monomer units incorporated in the polymer chains. The polymer may be linked in the matrix to the coating polymer. The polymer, although cross-linked, may also contain further functions (e.g. of the above types) capable of further (cross-)linking to form another matrix of the first aspect of the present invention. Matrices comprising such polymers form one embodiment of the first aspect of the present invention.

The precursors of the present matrices which comprise an un-cross-linked precursor of the olefin/acrylic polymer and the present coated filler form a second aspect of the present invention. These precursors are convertible to the matrices of the present invention, and are of specific interest, since it is often such precursors which are used in the production process for the filled polymer matrices of the present invention (described further below).

Thus, the present invention in a second aspect provides a precursor composition for the production of a filled cohesive cross-linked olefin/acrylic polymer matrix which composition comprises a dispersion of a filler and a dispersion and/or solution of a coating composition as hereinbefore defined in a matrix of a precursor for such a matrix polymer.

The coating composition may coat the filler at least in part and/or itself be freely dispersed and/or dissolved in the precursor matrix.

Within the scope of the term "polymer" in the expressions hereinbefore are included all types of homo- and co-polymers and polycondensates, and, in the case of the coating polymer, oligomers and oligocondensates. Indeed the molecular weight of such a coating oligomer may be as low as 200 and preferably is sufficiently low that the 'polymer' is a non-particulate fluid, such as a liquid.

Within the scope of the term "precursor of an acidic group", are included all groups convertible to free acid groups (in particular under the coating and matrix processing conditions described hereinafter), for example salts, anhydrides and imides, in particular of carboxylic acid and diacid functions.

The use of the present coating compositions in the present particular matrices confers particularly good physical properties on, or enhances particularly well the physical properties of, such coated fillers and such filled matrices.

In the present matrices the cross-linked olefin/acrylic matrix polymer(s) and coating polymer(s) and their precursors have good mutual compatibility. Most conventional cross-linked olefin/acrylic polymers or their precursors (of widely varying chemical constitution) are believed and/or appear to have particularly good compatibility with the present coating polymers or compositions (described further below).

If the matrix contains any matrix polymer or oligomer other than the present matrix polymer(s), this material should of course be compatible with the other components of the matrix, such as the present matrix polymer and the coating polymer, and preferably be capable of cross-linking or be cross-linked to such polymer components.

Similarly the present coating polymers, and hence cross-linked olefin/acrylic matrix polymers, appear to have not only the necessary compatibility with different filler materials, but to be versatile with a wide range of such materials including inter alia amphoteric, basic and siliceous fillers, in particular fire retardant basic fillers.

Within the above general guidelines and those given hereinafter suitable matrix polymers and particulate fillers may be established by routine trial.

Within cross-linked olefin/acrylic polymers as defined hereinbefore, the or each matrix polymer may be a thermosetting polymer or a thermoplastic. It may be a homopolymer or any type of copolymer (e.g. random, block or graft).

Particularly useful as matrix polymers appear to be cross-linked polymers (including homo- and co-polymers) based on monomers selected from optionally substituted olefins, including unsubstituted olefins such as ethylene and propylene, and vinylics such as vinyl acetate (eg EVA polymers) and vinylidene dichloride; and acrylics such as acrylic and methacrylic acids and esters thereof, such as $C_{1-6}$ alkyl esters for example methyl esters thereof, and other acrylic species such as acrylonitrile (e.g. acrylic rubbers); and/or other monomer species e.g. dienes such as butadiene and norbornadiene (eg EPDM polymers). Preferred matrix polymers are based on such olefins optionally copolymerised with acrylics (e.g. EVA and EPDM polymers and Vamac elastomers). All such polymers may also include functions, which are capable of cross-linking or which have undergone cross-linking, other than those inherent in them (such as olefinic functions) by virtue of the constituent monomers mentioned above. Such further functions may include further olefinic groups, or substituted silyl functions such as those mentioned in U.S. Pat. No. 3759869. Especially useful are such polymers linked (generally during matrix formation) to the coating polymer e.g. via one or more unsaturated groups, such as olefinic groups, often in the matrix polymer skeleton. Such olefinic groups may be derived from a diene comonomer.

The coating polymer within the filled matrix of the first aspect of the present invention is favourably one with a number average molecular weight in the range 200 to 50,000, preferably in the range 500 to 15,000. These materials tend to be moderately viscous liquids at room temperature. However, within the scope of the present invention the coating polymers may vary widely in chemical and physical properties. Within the above ranges the dispersibility of any coating polymer as a neat liquid, a solution or particles in the matrix under the conditions of matrix formation (described hereinafter) or filler coating (conventional) should be sufficient to cover the filler surface adequately and evenly the desired extent. This parameter will clearly tend to indicate to the skilled man preferred coating polymers within the foregoing favoured materials. For many types of these coating materials, preferred polymers will lie in the molecular weight range of 750 to 11,000 e.g. 750 to 3,000 and 3,000 to 11,000.

(All the foregoing molecular weights include the acid/precursor groups and unsaturated groups within the coating polymer, and weight percentages of such groups hereinafter are based on the weight of the total polymer including such groups).

The coating polymer contains an unsaturated group, generally a plurality of such groups. The unsaturated group(s) are preferably olefinic, and the coating polymer is capable of reacting or has reacted with a cross-linked but still reactable matrix polymer or its precursor for example by free-radical cross-linking, with a cross-linkable matrix polymer or its precursor which cross-linked but still further also contains olefinic unsaturation. or where the matrix polymer contains no such unsaturation but is capable of undergoing or has undergone further free-radical cross-linking with olefinic unsaturation in the coating polymers. The coating polymer is preferably linked to the matrix polymer by such groups.

Olefinic groups may be present as part of a polydiene structure, in the case of a poly-1,3-diene structure, as backbone olefinic groups or as pendent vinyl groups. Examples of such structures include polymers and copolymers derived from one or more dienes, of which the most conveniently available is butadiene, although others may be used if desired (for example isoprene, chloroprene and 1,5-cyclooctadiene and mixtures thereof). Examples of other compounds which may be copolymerised with the diene or dienes include a wide range of vinyl monomers, for example, styrene, acrylonitrile, and mixtures thereof.

The probability and extent of coating-matrix bonding is of course increased in precursor matrices as hereinbefore described where the coating and matrix polymers have olefinic unsaturation and/or by maximising the weight percentage of olefinic groups in each polymer, e.g. in cross-linking functions, commensurate with the relative proportions of matrix and coating polymers.

A preferred concentration of any unsaturated binding group in the coating polymer is at least one such group per 800 total polymer molecular weight, preferably at least 5% w/w of the polymer weight, in particular at least 10% w/w.

Suitable acidic groups within the coating polymer include carboxylic acid and diacid groups. Precursors of the acidic group(s) in which active hydrogen is reversibly removed are preferred over the acidic groups themselves, for example neutral salts or anhydrides of the acidic group.

Suitable salt precursors include alkali metal (e.g. sodium), alkaline earth metal and in particular higher alkyl quaternary ammonium salts of carboxylic acid groups.

Suitable anhydrides and imides include $\alpha,\beta$-dicarboxylic cyclic anhydrides and imides, as terminal or non-terminal functions, such as those derived from maleic anhydride or imide, not least because of the generally good compatibility of the relevant coating polymer with the present matrix polymers and their precursors.

The desirability of good filler-coating and coating-matrix bonding in eg enhancing tensile strength and wear resistance of the polymer matrix has been referred to above. The coating polymer appears to bind well to conventional fillers. The general mechanism is not clear, but, without prejudice to the invention in general, in the case of a basic filler the coating polymer is believed to be chemically bound to the surface of a basic filler within the matrix by reaction of the acidic group with the surface.

A preferred concentration of any acidic group or any precursor thereof in the coating polymer is at least one such group per 800 total polymer molecular weight, preferably at least 5 weight %, in particular at least 10 weight % of the polymer.

The foregoing coating polymers belong to a known class of materials.

Most of the matrix polymers mentioned hereinbefore may also be used as an additional coating composition component.

It will be appreciated from the foregoing that precursor coating compositions which contain an unreacted unsaturated group (and which are thus still capable of cross-linking and/or linking to a matrix polymer) are of specific interest, since it is often such precursors which are used in the production process for the filled matrices of the present invention (described further below).

Such precursor coating compositions may contain additives appropriate to the matrix formation reaction generally as up to 5 weight % each of the total composition, eg an antioxidant, or a free radical initiator to promote good intra-coating, coating-matrix and/or intra-matrix linking.

Often, however, the coating composition will consist essentially of the coating polymer.

In the matrices of the present invention the proportions of matrix polymer to filler to coating polymer may vary, and may be optimised to give desired physical properties by routine trial. Where the filler is coated before incorporation into the matrix (see description of process hereinafter) it is believed that the proportion of coating to filler in the matrix is unchanged, (i.e. by virtue of the constitution of the coated filler particles being unchanged). Where the coating polymer and uncoated filler are incorporated separately into the matrix (see process description hereinafter) it is unclear what proportions of coating polymer are eventually present as a filler coating and as 'free' polymer in the product matrix, since the proportion of filler to free coating polymer is modified during manufacture by binding of some of the free polymer to the filler surface. By no means all of the free polymer necessarily disappears in this way; indeed, higher proportions of coating polymer are generally used in these circumstances to ensure adequate filler coating.

For these reasons the matrix composition is best described in terms of total matrix polymer (or precursor)-:filler:coating polymer proportions and these may vary widely within the scope of the present invention inter alia with the density and specific surface area of the filler.

Thus, the proportion of the total matrix of matrix polymer may be as low as 15%, that of the filler is often 3 to 85%, and of the coating polymer up to 50%, all percentages being by weight. Preferably the proportion of filler is 55 to 85%.

Within the above ranges the dispersibility of the filler in matrix polymer and/or the coating polymer under the conditions of matrix formation (described hereinafter) should be sufficient for them to cover the filler surface adequately and evenly. This parameter will clearly indicate to the skilled man preferred proportions for given materials.

For a filler of relative density of about 2, and a specific surface area of about 3 $m^2 gm^{-1}$, favoured proportions are 25 to 90% matrix polymer, 10 to 75% preferably 55 to 75% filler and 0.5 to 15% coating polymer; favoured proportions for other particle parameters will vary in a manner evident to the skilled man.

As mentioned hereinbefore, it is preferred that the filler is a fire-retardant present at a high loading level to confer acceptable fire retardancy.

For such matrices the proportions may be down to 15% matrix polymer, 55 to 85% filler and up to 35% coating polymer.

Favoured proportions are 25 to 40% matrix polymer, 55 to 75% filler and 0.5 to 15% coating polymer.

The matrix may also contain a conventional antioxidant, and other conventional additives, for example plasticisers, pigments and antiozonants, suitably as up to 5 weight % of the matrix.

Any particulate filler may be used in the present invention provided that the filler is stable in the coated end product, either as such or incorporated in a matrix polymer or a precursor thereof, and under any processing conditions, in particular under any filler heating or coating, or matrix formation, conditions; it is however preferred that the filler is capable of binding to or adsorbing the coating polymer. The filler should of course desirably be insoluble in water.

The coated filler dispersed in the matrix may be inter alia amphoteric, basic or siliceous.

The filler may eg be amphoteric, eg such an oxide. Suitable such fillers include hydroxides and oxides of aluminium, including hydrated alumina. Such fillers may be of natural or synthetic origin.

The filler, if basic, may be for example an oxide, a hydroxide, a carbonate or a basic carbonate. Suitable fillers include oxides, hydroxides, carbonates and basic carbonates of alkaline earth metals and of zinc, and especially carbonates.

Of particular interest are fire-retardant fillers, such as magnesium hydroxide and basic magnesium carbonates of varying degrees of hydration, and Dawsonite (NaAl(OH)$_2$CO$_3$).

Such fillers may be of natural or synthetic origin.

Suitable siliceous materials may be natural or synthetic. Siliceous filler particles may consist of substantially pure silica, for example sands, quartzes or cristobalites or may contain silica together with a proportion of one or more other metal oxides, for example acidic oxides, e.g. titania, or metal oxides capable of forming silicates, e.g. calcium, magnesium, aluminium and combinations of these. They may consist of a silicate, provided the silicate is one which is suitable for use as a filler, for example if it is insoluble in water. Suitable silicates include clays and talcs which can be produced in a sufficiently finely divided form to serve as fillers. The filler may comprise a silicate, for example it may be a silicate coated alkaline earth metal carbonate as described in U.S. Pat. No. 4374178.

It is less preferred that the siliceous particles consist predominantly of silica and especially less preferred that they consist of substantially pure silica itself.

Mixtures of all the foregoing particulate fillers may be used.

The filler particles for use in our invention may have any form suitable for a filler, and may have a wide variety of particle shapes and sizes. For example, they may (most commonly) be of irregular, fibrillar or laminar form. Most conveniently the particulate filler is a free-flowing finely-divided powder, as usually commercially available.

Most commonly the filler particles will have a size in the range 10 Angstrom to 1 mm, though we prefer, on account of the good reinforcing effect and high filler loading that is possible, that the particle size is in the range 0.01 to 100 micron, e.g. 0.05 to 20 micron. Typically the particles will have a specific surface area of 0.1 to 250 m$^2$g$^-$, preferably 5 to 75 m$^2$g$^{-1}$, in particular 5 to 25 m$^2$g$^-$.

For high filler loadings, for example as are desirable for fire-retardant fillers, the particles may be a mixture of two or more sets of particles with two widely differing mean particle sizes such that particles of one or more set can fit in the interstices of those of the other(s) within the matrix. Only one such set need be of the present invention.

The present coated fillers which are fire-retardants confer better than average fire-resistance (i.e. better than merely acceptable fire-resistance) on polymer matrices of the present invention in which they are dispersed.

As regards the term "acceptable fire resistance" relating to the use of such products in polymers, it is well-known to the skilled person that the degree of fire-resistance which can be conferred on an organic polymer, in particular a cross-linked olefin/acrylic polymer, by a fire-retardant varies with the specific polymer. This dictates the applications for which such a polymer is suitable, and hence has established a fire resistance level which is generally acceptable in the art for that polymer. Thus, for example, one generally used index of fire retardancy is the oxygen index. For a fire-resistant cross-linked polyethylene (a material on which it is difficult to confer a good oxygen index value using fillers) an oxygen index of 25 is a generally acceptable value conferred by a threshold weight proportion of a fire-retardant. (Below that threshold this acceptable index is not achieved). However, in more stringently demanding applications, for example in electrical cable sheathing, only higher oxygen indices of the order of 28 and above are acceptable. Within the scope of the present invention, a polymer may be chosen, which, treated with at least a threshold weight proportion of a fire-retardant, can achieve such an acceptable fire-resistance (for that polymer); for example a cross-linked olefin-vinylic copolymer such as ethylene vinyl acetate ('EVA') copolymer will be used.

Thus, a preferred fire-retardant filler of the present invention can confer an oxygen index of at least 28, more preferably above 33, on a polymer matrix in which it is incorporated, in particular in an EVA copolymer.

For many polymers this index can be achieved using 110 to 300% w/w based on organic matrix polymer of the present fire-retardant, for example 110 to 200% in polymers for electrical cable sheathing, such as in particular EVA copolymers. At these proportions, the present fire-retardant fillers are generally less expensive than similar fire-retardants in similar use.

In a third aspect the present invention provides a fire-resistant organic polymer matrix, in particular a cross-linked fire-resistant ethylene-vinyl acetate, ethylene-propylene or ethylene-propylene-diene copolymer matrix comprising a fire-retardant and having an oxygen index of at least 33.

In a fourth aspect the present invention provides a process for the production of a filled cohesive cross-linked olefin/acrylic polymer matrix, which process comprises intimately mixing such a matrix polymer or a precursor thereof with
 a) a filler and a coating composition or precursor thereof as hereinbefore defined, or
 b) a filler coated with a coating composition or precursor thereof and thereafter as necessary converting any precursor in the mixture to a cross-linked olefin/acrylic polymer matrix.

Variant a) is preferred.

A mixture of cross-linked olefin/acrylic polymers and/or their precursors may of course be used. Precursors of the matrix polymer(s) and/or the final coating composition are preferred.

The mixing step in either process variant may be carried out by conventionally blending the matrix polymer or precursor with the coated filler or with the coating polymer and the filler, for example by milling eg using a ball-mill or multi-roll mill or high-shear mixing or mixing using a planetary vacuum mixer.

It may be helpful to apply heat in either process step e.g. to promote any linking reactions. Suitable reaction temperatures will be below those deleterious to any component, typically in the range of 15 to 200° C, e.g. ambient.

The process may be carried out in the presence of protecting agents, e.g. antioxidants, and/or in an inert atmosphere, e.g. nitrogen, argon or solvent vapour, if it is desired to guard against deterioration of the polymer during any heating that may be necessary, and with conventional additives (eg polymer processing aids), such as described as optional components of the coating composition precursor or the matrix precursor, which may be incorporated in either or both, before or during the process.

In preferred variant a) not all of the coating polymer of the present invention may coat the filler, but coating in this process variant appears not to be hampered. However, it may be desirable to use an excess of coating polymer/composition over that theoretically needed to coat the filler alone to the desired extent.

The coated fillers for use in variant b) belong to a known class of such fillers and may be prepared by known methods. Preferably they are coated with a proportion of coating polymer/composition or precursor thereof which produces a matrix composition within the ranges mentioned hereinbefore.

Each filler particle will often be on average at least 95% coated, favourably fully coated. However, partially coated particles may be acceptable, for example at least 40%, favourably at least 75%, coated.

In both process variants of course the process components are generally a continuous or particulate fluid, and there must also be sufficient matrix polymer(s) or precursor(s) to flow and mix with, and fully enclose, the particles, and ensure good dispersion of the filler throughout the product matrix. Suitable proportions within the ranges given hereinbefore can be determined by routine trial, and are not necessarily critical.

If needed in either process variant, a vehicle (solvent or dispersant) for the polymer/precursor and/or the coating composition may be used to assist the spread of the coating and/or matrix polymer over the filler (especially when the coating represents a low proportion of the matrix and/or the coated filler).

Any such vehicle may be chemically inert and of low flammability and low toxicity. Where the desired product matrix is a solid, a low boiling point will tend to be significant in the subsequent necessary removal of the vehicle from the matrix.

It may in some cases be convenient to use a vehicle which contains unsaturation, eg olefinic or acrylic unsaturation in particular where a precursor coating or matrix polymer contains unreacted unsaturation of this type. Such a vehicle will of course in general be capable of taking part in any concomitant or subsequent linking reactions, eg with the coating and/or matrix polymer precursor. advantageously to promote matrix-filler linking.

The desired polymer matrix may be a fluid, such as a sealant or high-build surface coating, in which the matrix polymer is a solution, or emulsion or other dispersion in a vehicle. In such a case the processing vehicle may be retained as the vehicle for the final product.

Suitable conventional vehicles and their proportion in the process (and optionally in the desired product) will be well-known to the skilled man, or can be readily determined by simple routine trial.

Matrix cross-linking, matrix-coating linking, coating cross-linking, and/or coating-filler linking reactions may be incorporated in either or both steps. Cross-linking or linking reactions may involve the matrix polymer(s) or precursor(s), the coating polymer of the invention, and any other polymer in the coating.

Where the foregoing linking reactions are in the second process (conversion) step and involve any matrix polymer, they are part of a conventional matrix curing process. This subsequent step may be effected conventionally, eg by heating to set a thermosetting polymer or its precursor, or by heating, processing and cooling for a thermoplastic. Radiation curing may also be used.

Linking of the types above may take place separately or concurrently when any of the foregoing polymers/-precursors are of the following preferred types:

Preferably the coating composition comprises a coating polymer in which the unsaturation is olefinic, in particular a polydiene based polymer. Preferably also the or at least one cross-linked olefin/acrylic polymer or precursor is a compound which may be cross-linked with the coating polymer, in particular with a polydiene based coating polymer. Examples of such precursors include those of the second aspect of the invention.

The filler and the coating polymer are preferably capable of good mutual bonding. A basic filler and a coating polymer which comprises at least one terminal or non-terminal cyclic anhydride or imide group (in particular a carboxylic such group) as an acidic group precursor are among preferred filler-coating combinations.

Where a basic filler is coated by a coating composition comprising a polymer containing an acidic group precursor, it will be desirable to convert that precursor group to the acidic group, so that the filler is coated at least in part with coating polymer which is bound to the filler surface. This is conveniently effected in situ in the matrix formation process by incorporating a converting reagent in the process. Thus, for example, where the precursor is an anhydride, a suitable reagent is water, either as reactable water within the filler itself or within any vehicle used.

The optimisation of all the foregoing non-extreme process conditions is a matter of routine trial.

We have found that the coating composition used in the present invention acts as a good dispersant for filler particles in matrices of cross-linked olefin/ acrylic polymers or their precursors, and accordingly in a fifth aspect the invention provides the use of such coating compositions as dispersants for fillers in such matrices.

The preparation of filled polymer matrices of the present invention is illustrated by the following Examples. The preparation of coating polymer materials is illustrated by the following Description.

DESCRIPTION

Preparation of MPBD organic coating Polymer (Maleinised Polybutadiene)

Maleinised polybutadiene was prepared by the reaction of polybutadiene (Mn = 1300, 100 parts) with maleic anhydride (25 parts) at 180-190° C. for six hours under a nitrogen atmosphere, with an antioxidant.

EXAMPLE 1

Polymer matrices of the following compositions were compounded on a twin roll mill as in process variant a) described hereinbefore (i.e. with direct compounding of inter alia matrix/polymer, uncoated filler and a dispersion of a coating composition in the mixture). The matrices were then press cured at 153° C, cure times being determined by a Monsanto rheometer.

Composition 1

| | | parts by weight |
|---|---|---|
| Matrix polymer: | EPDM, Vistalon 5600 (ESSO) | 100 |
| Filler: | Alumina trihydrate SF7E (Baco) | 150 |
| Coating: Composition: | MPBD from 'Description' | 3 |
| Other: | ZnO | 5 |
| | Permanax WSP (Vulnax) | 1 |
| | Anconer ATM3 (Anchor) | 2 |
| | Perkadox 14-40B (AKZO) | 6 |
| cure time: | 12.0 min | |

Composition 2

As for composition 1, but using MPBD from Description (6 parts by weight) as coating composition Cure time 15.0 min Composition 3 and 4

As for compositions 1 and 2 but using magnesium HSE (Steetly) in place of alumina hydroxide, Lycal 96 trihydrate
Cure time: 15.0 min All the above cured filled matrices were tested, and found to have good oxygen index, water pick-up, tensile and tear strengths, hardness and other physical properties.

EXAMPLE 2

Polymer matrices of the following composition were compounded in a twin roll mill as in Example 1 (110° C. front roll, 40° C. back roll) and then compression moulded (10 min at 180° C.) into sheets.

Composition 5

| | | parts by weight |
|---|---|---|
| Matrix polymer: | EVA, Evatane 28-05 (ICI) | 148 |
| Filler: | Alumina trihydrate (Baco Superfine 7E Chemicals) | 188 |
| Coating: | MPBD from 'Description' | 5.6 |
| Other: | Rhenogran P50 (Rhein-Chemie Rheinau | 4.5 |

| | parts by weight |
|---|---|
| GmbH) | |
| Perkadox 14-40B (AKZO) | 9 |

Composition 6

As for composition 5, but using a hydrated calcium magnesium carbonate Ultracarb U5 (Mircrofine Minerals) in place of aluminna trihydrate.

Composition 7

| | | parts by weight |
|---|---|---|
| Matrix polymer: | EVA Evatane 28-05 (ICI) | 98.5 |
| Filler: | Magnesium Hydroxide, Kisuma (Kyowa) | 125 |
| Coating: | MPDB from 'Description' | 2.5 |
| Other: | Rhenogran P50 (Rhein-Chemie Rheinau GmbH) | 3 |
| | Perkadox 14-40B (AKZO) | 6 |

Composition 8

As for composition 7, but using magnesium hydroxide 200-06 (Asahi Glass) in place of 'Kisuma'.

EXAMPLE 3

All the final, filled matrices were found to have good appearance and were tested in accordance with the following procedures.

Tensile stress-strain properties were measured in an Instron 1122 Tensile Testing Machine according to BS903 part A2 using dumbels cut from 2 mm thick sheet. Tear strength properties were measured according to DS 903 part A3 using method c-crescent shaped test pieces cut from 2 mm thick sheet and nicked using a Wallace Tear Test Specimen Nicking Cutter.

Hardness was measured on 4 mm thick sheet accordingly to BS 903 part A 26 using a Wallace Dead Load Hardness Tester for Rubber.

Rebound resilience was measured on 4 mm thick sheet according to BS 903 part A8 using a Dunlop Tripsometer with a drop angle 45°.

Compression set was measured according to BS 903 part A6 using a Wallace compression set apparatus. The results were calculated from plugs subjected to a 25% compressive strain for 24 hours at 70° C.

Volume swell was measured on 2 mm thick sheet according to BS 903 part A16 using a volumetric method. the results were calculated on samples subjected to distilled water at 95° C for 72 hours.

Some of these properties are shown in the following Table.

TABLE

FILLER PERFORMANCE IN MATRICES OF EXAMPLES 1 AND 2

| COMPOSITION | TENSILE PROPERTIES | | % Elongation to break | Tear Strength $Nmm^{-1}$ (Crescent) | Rebound Resilience % | Volume Swell % | Hardness (IRHD) |
|---|---|---|---|---|---|---|---|
| | 100% Modulus MPa | Tensile Modulus Mpa | | | | | |
| 1 | 8.9 | 13.6 | 260 | 45.3 | 59 | −0.4 | 85 |
| 2 | 10.1 | 13.8 | 159 | 42.8 | 56 | −0.4 | 89 |
| 3 | 8.7 | 10.2 | 166 | 45.2 | | 1.3 | 92 |
| 4 | 10.2 | 12.3 | 160 | 42.6 | | 0.9 | 92 |

We claim:

1. A cohesive polymer matrix comprising a matrix polymer and a coated particulate filler dispersed therein, characterized in that the matrix polymer is a cross-linked olefin/acrylic polymer, and the filler is coated at least in part with a composition comprising an organic coating polymer of number average molecular weight inn the range of 750 to 11,000, which contains an acidic group or its salt, imide or anhydride and an olefinic unsaturated group either bonded or non-bonded to the matrix polymer.

2. A matrix according to claim 1, characterized in that the matrix polymer is a cross-linked ethylenepropylene, ethylene--vinyl acetate or ethylene-propylene-diene copolymer.

3. A matrix according to claim 1, characterized in that it comprises 25 to 40% matrix polymer, 60 to 75% filler and 0.5 to 35% coating polymer, all percentages being by weight.

4. A matrix according to claim 1, characterized in that the coating polymer comprises at least 5 weight % of unsaturated groups.

5. A matrix according to claim 1, characterized in that the coating polymer is a substituted polybutadiene.

6. A matrix according to claim 1, characterized in that the coating polymer comprises an α, β-dicarboxylic cyclic anhydride group or the product of the reaction of the same with the filler surface.

7. A matrix according to claim 1, characterized in that it has an oxygen index of at least 28.

* * * * *